United States Patent Office 3,413,244
Patented Nov. 26, 1968

3,413,244
POLYOLEFINE CELLULAR PRODUCTS
Yvan Landler, Sceaux, Pierre H. Lebel, Rueil-Malmaison, and Jack Benard, Paris, France, assignors to Pneumatiques, Caoutchouc Manufacture et Plastiques Kleber-Colombes, Colombes, Hauts-de-Seine, France, a French body corporate
No Drawing. Filed Apr. 29, 1965, Ser. No. 451,974
Claims priority, application France, Apr. 29, 1964, Patent 972,900
15 Claims. (Cl. 260—2.5)

ABSTRACT OF THE DISCLOSURE

Polyolefine cellular products consist of a polyolefine grafted and cross-linked by units of a compound containing two non-conjugated ethylenically unsaturated double bonds. The compound is polymerised in the polyolefine at the moment when the polyolefine is cellularised. Low density (0.02 to 0.1) products are obtainable thereby. 2 to 50 (and preferably 2 to 10) parts by weight of the compound are used for 100 parts by weight of the polyolefine. The process may be conducted by heating a mould containing the mixture to a uniform temperature between 100° and 180° and maintaining a pressure of 10 to 200 kg./cm.$^2$ for 1 minute to 6 hours since the reaction is exothermic.

---

The present invention relates to polyolefine cellular or foamed products and to methods of preparing same.

Cellular polyolefines prepared by extruding or moulding polyolefine with solid blowing agents or volatile solvents, have a density of the order of 0.3–0.5.

In order to obtain a lower density of the order of 0.02–0.1, it is necessary to avoid the collapse of the foam, which is very fluid at the moment of its formation, in order to stabilise the polyolefine foam and to avoid it collapsing, i.e. sinking on itself, the polyolefine is cross-linked as soon as the cells are created.

This cross-linking may be effected either by radiation (see for example French Patent No. 1,184,861), or by a chemical cross-linking agent such a dicumyl peroxyde (see for example Belgian Patent No. 611,525); to the same end, it has also been proposed to incorporate with the polyolefine a small quantity of another polymer, having a high viscosity such as to ensure a certain behaviour in the cellular structure (see for example French Patent No. 1,281,938).

These cross-linking methods however present serious disadvantages: the use of ionising radiation necessitates costly equipment, and certain precautions must be taken for putting it into operation; they also produce a degradation, in the case of polypropylenes. The chemical cross-linking agents are unstable products, whose manipulation is delicate and which do not allow certain polyolefines, in particular polypropylene to cross-link; their use is impracticable for polyolefines of high melting point, because they decompose at a temperature lower than the melting point which is necessary to achieve in order to obtain a cellular product. Finally, the method of incorporating another polymer of high viscosity, such as polystyrene, leads to a mixture of incompatible polymers, which presents the well-known phenomenon of phase de-mixing; the cellular products obtained have weak physical and mechanical properties because the grains of polyolefine and polystyrene constituting the walls of the cells are without chemical ties and therefore crumble easily.

The present invention has for an object a method of manufacturing cellular polyolefines of low density enabling the above mentioned disadvantages to be avoided or minimised.

It also has for an object cellular polyolefines obtained by this method.

The method of the invention consists in polymerising at the moment when cells are created in a polyolefine by any known means, a compound containing two non-conjugated, ethylenically unsaturated double bonds, to obtain a cellular polyolefine which is cross-linked by a network of units of said polymerisable compound, said units being grafted on the polyolefine.

This polymerisation in situ permits the foam to be stabilized when it has achieved its optimum stage of expansion due to the grafting and the cross-linking of the compound which is polymerising within the polyolefine.

The polymerisable compound according to the invention must contain two non-conjugated ethylenically unsaturable double bonds; in fact, if it contains a single double bond, grafting occurs but there is not a sufficient cross-linking between the different polyolefine molecules and not inconsiderable quantities of homopolymer are obtained, the presence of which leads to the above mentioned disadvantages of phase de-mixing; on the other hand, it is important that these two double bonds be non-conjugated because they must both react during the polymerisation to facilitate the grafting and cross-linking in a sufficiently short time so as to adopted in practice; however, a compound having two conjugated double bonds, on atoms of carbon 1–2 and 3–4 for example, is principally polymerised by opening the double bonds on the carbon atoms 1 and 4, one of the double bonds not participating in the polymerisation but being present in the polymerised units between the carbon atoms 2 and 3; a compound having two conjugated double bonds, thus presents the same disadvantages as those which are described previously in the case of a compound comprising only a single double bond, since it acts in a similar manner in practice during polymerisation.

Said polymerisable compound may contain more than two double bonds, it is sufficient that two of them be not conjugated. These two non-conjugated double bonds may or may not be identical.

By way of example, the following may be cited: Open-chain hydrocarbons such as hexadiene 1–5, cyclic hydrocarbons, in particular aromatic hydrocarbons such as di-allylbenzene, vinyl-allylbenzene, terpenic hydrocarbons such as methyl-2-methylene-6-octadiene 2–7, diethylenic alcohols such as pentadiene 1–4, ol-3, sulfones such as divinylsulfone, amines such as cinnamylvinylamine, aldehydes such as citral, ketones such as dibenzylacetone, acids such as linoleic and linolenic acid, esters such as diesters of monoethylenic acids and glycols.

However, it is preferred in the scope of the present invention to polymerise compounds comprising only two identical non-conjugated ethylenically unsaturated double bonds which are activated by the presence of a double bond between an atom of carbon in the α position and another atom; by way of example, the following will be cited: N-N' methylene di-acrylamide, N-N' methylene di-methylacrylamide, ethylene diacrylate, ethylene di-methylacrylate, trimethylene diacrylate, trimethylene, dimethylacrylate, propylene diacrylate, propylene dimethylacrylate, dicinnamyl terephthalate, dicinnamyl oxalate, distyryl terephthalate, distyryl oxalate etc.; the best results have been obtained with those compounds whose two double bonds are in the end position, for example in the form of two methylene radicals.

And more particularly still, the compounds responding to the preceding definition, which are hydrocarbons, are preferred; by way of example the following will be cited: divinylbenzenes, di-1-propenylbenzenes, di-isopropenyl-benzenes, divinyl naphthalenes, di-1-propenyl naphthalenes, di-isopropenyl naphthalenes, divinylanthracenes, di-i-propenyl-anthracenes, di-isopropenyl-anthracenes, etc.; in this case the best results have also been obtained with these compounds whose two double bonds are in the end position, for example in the form of two methylene radicals.

The polymerisable compounds according to the invention are used in the proportion of 2 to 50 parts by weight for 100 parts by weight of polyolefine: if less than 2 parts by weight are used, the effects of cross-linking, in particular the resistance to solvents and resistance to compression of the foam, are not felt because the cross-linking is insufficient; if more than 50 parts by weight of the compound according to the invention are used, the compound once polymerised, has a direct influence, by its presence in such proportions, on the properties of the polyolefine: everything occurs as if not a polyolefine foam but a foam containing no more than 66% by weight at the most of polyolefine being used. However, in the scope of the present invention, it is preferred to use the previously defined polymerisable compound in the proportion 2 to 10 parts by weight for 100 parts of polyolefine.

It must be noted that the presence of other polymerisable compounds not responding to the definition of those entering in the scope of the present invention is not harmful; thus it is that to other polymerisable compounds according to the invention may be added other polymerisable compounds such as styrolene, cyclopentadiene, acrylonitrile, acrylamide, methyl methacrylate, etc.

The polymerisable compounds according to the invention are polymerised by any suitable means within the capability of the man skilled in the art: for example the simple action of heat enables divinylbenzene to be polymerised; if not, a product supplying the free radicals necessary for starting the polymerisation, such as peroxides, is added, certain blowing agents, such as azo-di-isobutyronitrile, may perform this function. This polymerisation must take place at the same time as the cells are created in the polyolefine; this is achieved by effecting polymerisation and cellularisation in the single operation, for example simply by heating the adequate mixture.

Moreover this polymerisation has the advantage of creating, within the polyolefine an internal source of heat, because these polymerisation reactions are exothermic, which enables the time for heating the mixture necessary for effecting simultaneous polymerisation and creation of the cells to be considerably reduced.

In fact, it is important to emphasise that suitable cellular products cannot be obtained from polyolefines which have already been grafted and cross-linked by the polymerisable compounds according to the invention and by attempting to create cells by any suitable means; the polyolefines thus treated cannot be suitably moulded, because the different particles do not become mutually attached, and it is thus impossible to create cells within such polymers. In other words, only a polymerisation in situ during the formation of the cells enables suitable foam to be obtained, which is stabilized at its optimum state of expansion.

The cells are also created in the polyolefine by any suitable known means; volatile compounds such as halogenoalkanes, for example, carbon tetrachloride, may be used as blowing agents just as well as solid bodies which irreversibly decompose between 100 and 200° C. with a release of gas, such as azo compounds, for example, N-N-dimethyl-N-N′ dinitroso compounds, for example, N-N′-dimethyl-N-N′ dinitroso-terephthalamide or sulfonyl hydrazide compounds, for example sulfonyl hydrazide benzene.

The polyolefines utilised in the scope of the present invention are polymers containing at least 50 mole percent of monoolefines; it may deal just as much with homopolymers as with copolymers of two monoolefines or of one monoolefine and of another compound such as ethylene-acetate copolymers of vinyl, acrylic or alkylacrylic ethylene-ester, or of mixtures of these homo- or co-polymers. Polymers of $\alpha$-olefines of the type $RCH=CH_2$ are preferably used, in which R represents 1 atom of hydrogen or an alkyl radical having between 1 and 3 atoms of carbon; homopolymers of said $\alpha$-olefines are more particularly still preferred, and more especially polyethylene and polypropylene with which the most interesting results have been obtained.

The method according to the invention is particularly interesting when operation is effected by cycles of isothermic moulding; moulds are filled with a suitable mixture and they are introduced under a press maintained at constant temperatures, between 100 and 180° C., preferably, between 130–160° C.; then a certain pressure, between 10–200 kg./cm.$^2$ is applied for which times may be between 1 minute and 6 hours, and the mould is turned out; the cellular products thus obtained by isothermic moulding have cells, the majority of which are closed.

The present invention will be illustrated by the following non-limiting examples, in which all the parts indicated are parts by weight.

All the experiments have been effected in a mould measuring 300 x 300 x 20 mm.

Example 1

100 parts polyethylene of density 0.95 and fusion index 0.4 are mixed with 6 parts divinylbenzene, 9 parts azocarbonamide and 4 parts zinc acetate. A mould is filled with this mixture and it is left for ten minutes under a pressure maintained at 145° C. and ensuring a pressure of 60 kg./cm.$^2$.

On turning out the cellular product having closed cells from the mould at 145° C. and by leaving it to rest for 24 hours, a cellular polyethylene of density 0.4 is obtained having a good thermal stability, hardly any flow and a good resistance to aromatic, aliphatic, halogenic and ketonic solvents.

It has not been possible to mould a mixture of 106 parts of the same polyethylene containing 5.5% by weight of divinylbenzene which has already been grafted, with the same quantities of azodicarbonamide and zinc acetate.

On the other hand, if the same experiment is carried out but in the absence of divinylbenzene, heating must be undertaken for at least 30 minutes at 145° C. (since the polymerisation reaction of the divinylbenzene is exothermic, the heating must continue for a longer time when this compound is removed) removal from the mould can no longer take place at 145° C. because the foam flows from the mould, the press must be cooled to a temperature which is at least equal to 50° C. and the cellular product obtained 24 hours after turn out has a density greater than 0.200 with a very irregular structure.

Finally, the same experiment carried out by replacing the divinylbenzene by the same quantity of styrene produces, after ten minutes of moulding at 145° C. then allowing to stand for 24 hours, a cellular product of density 0.045 but which is soluble in the presence of heat in polyolefine solvents, and whose dimensional stability with regard to heat, leaves much to be desired.

Example 2

100 parts of polyethylene of density 0.92 and of fusion index 7 are mixed with 5 parts of ethylene dimethacrylate and 8 parts of carbon tetrachloride.

A mould is filled with this mixture and it is left for 10 minutes under a press maintained at 145° C. and ensuring a pressure of 60 kg./cm.$^2$.

On removing from the mould at 145° C. and after a stabilization treatment which consists in heating the product for 24 hours at 70° C. a cellular product is obtained having closed cells, which after 24 hours of rest, has a density of 0.045, a good dimensional stability at 80° C. and at 20° C. and a good resistance to solvents.

The same experiment carried out by replacing the ethylene dimethylacrylate by the same quantity of ethyl methylacrylate does not permit a cellular body to be obtained having all the qualities corresponding to those of the preceding cellular bodies.

It has not been possible to mould a mixture of 105 parts of polyethylene grafted by 4.5% by weight of ethylene dimethylacrylate with 8 parts of 1–2 dichloro-tetrafluoroethane.

Finally, if all the polymerisable compound is removed, the same precautions must be taken as indicated above, namely a longer heating time, remove from the mould at a temperature lower than 50° C., and a sufficiently heterogeneous cellular product having a density greater than 0.1, is obtained.

Example 3

1 kg. of amorphous polypropylene is ozonised at ambient temperature for 10 minutes in a current of oxygen of 400 litres per hour containing 1.50% by volume of ozone. Then 100 parts of polypropylene thus ozonised are mixed with 5 parts NN' dinitroso-NN' dimethylterephthalamide and 7 parts of NN' methylene-diacrylamide. A mould is filled with this mixture and is left for 8 minutes under a press maintained at 155° C. and ensuring a pressure of 60 kg./cm.$^2$. By removal from the mould at this moulding temperature of 155° C. and after a period of 24 hours, a cellular product is obtained, having closed cells, a density of 0.060 and a good dimensional stability at ambient temperature and in heat and a good resistance to solvents.

The same experiment carried out by replacing the NN' methylene-di acrylamide by the same quantity of N methyl acrylamide, does not enable a cellular product to be obtained having all the properties similar to those of the preceding cellular product.

It has not been possible to mould a mixture comprising on the one hand 107 parts of grafted polypropylene, by ozonisation effected in the above described conditions, with 6.5% NN' methylene-di-acrylamide and on the other hand 5 parts of NN' dinitroso-NN' dimethylterephthalamide.

Finally, if all the polymerisable compound is removed from the mixture of this example, heating must be continued for a longer time, removal from the mould must be effected at a temperature lower than 50° C., and a cellular product is obtained having a density greater than 0.100.

Example 4

50 parts of polyethylene of density 0.95 and of fusion index 0.4 are mixed with 50 parts of a copolymer 55:45 of ethylene with vinyl acetate, 5 parts of styrolene, 3 parts of divinylsulfone and 7 parts benzene-sulfonylhydrazide. A mould is filled with this mixture and is left for 10 minutes under a press maintained at 145° C. at 60 kg./cm.$^2$. After removal from the mould at 145° C. and after a period of 24 hours, a cellular product is obtained having closed cells, density 0.030 and having good characteristics of thermal stability, flow and resistance to solvents.

The same experiment carried out by removing the 3 parts of divinylsulfone does not enable a cellular product to be obtained having such characteristics.

The grafted copolymer obtained by polymerising 5 parts of styrolene and 3 parts of divinylsulfone cannot be moulded on a mixture of 50 parts polyethylene and 50 parts ethylene-propylene copolymer.

Finally, the removal of all the polymerisable compound from the mixture utilised in this example, does not enable operation to be effected in conditions which are as economical as those of an isothermic moulding: the press must be cooled before removal from the mould and no cellular product of density lower than 0.100 is obtained.

We claim:

1. A cellular polyolefine product comprising a polyolefine containing at least 50 mole percent of monoolefines, said polyolefine having been foamed, grafted and cross-linked simultaneously, said foaming being effected by means of a first compound which is a blowing agent, said grafting and cross-linking being effected by polymerised units of a second compound containing two non-conjugated ethylenically unsaturated double bonds, whereby the foam is stabilised at its optimum state of expansion to yield a product of low density.

2. Polyolefine cellular products according to claim 1 having a density of between 0.02 and 0.100.

3. Polyolefine cellular products according to claim 2, wherein the polyolefine is a polymer of an α-olefine of the type R CH=CH$_2$ and R is selected from the group consisting of an hydrogen atom and an alkyl radical containing between 1 and 3 carbon atoms.

4. Polyolefine cellular products according to claim 3, wherein the polyolefine is a homopolymer.

5. Polyolefine cellular products according to claim 4, wherein the polyolefine is selected from the group consisting of polyethylene and polypropylene.

6. Polyolefine cellular products according to claim 1, wherein the polymerisable compound contains only two identical non-conjugated ethylenically-unsaturated double bonds, which are both activated by the presence of a double bond between a carbon atom in an α-position, and another atom.

7. Polyolefine cellular products according to claim 6, wherein the two identical non-conjugated ethylenically-unsaturated double bonds, activated by the presence of a double bond between a carbon atom in α-position and another atom are in the terminal position in the form of two methylene radicals.

8. Polyolefine cellular products according to claim 6, wherein the polymerisable compound is a hydrocarbon.

9. Polyolefine cellular products according to claim 7, wherein the polymerisable compound is a hydrocarbon.

10. Polyolefine cellular products according to claim 1, containing from 2 to 10 parts by weight of polymerised units of said compound for 100 parts by weight of polyolefine.

11. In a process of preparing polyolefine cellular products, the improvement which consists in ismultaneously creating cells in a polyolefine containing at least 50 mole percent of monoolefines by means of a first compound which is a blowing agent and grafting and cross-linking the polyolefine by polymerising in every 100 parts by weight of polyolefine from 2 to 50 parts by weight of a second compound containing two non-conjugated ethylenically-unsaturated double bonds, the cellularised polyolefine thereby being stabilised at its optimum state of expansion to yield products of low density.

12. In a process according to claim 11, the improvement which consists in using a mouldable composition containing a polyolefine, a blowing agent selected from the group consisting of volatile compounds and solid gas-releasing compounds irreversibly under the action of a temperature between 100 and 200° C., and a polymerisable compound containing two non-conjugated ethylenically-unsaturated double bonds.

13. In a process according to claim 11, the improvement which consists in simultaneously creating cells and polymerising said compound by heating.

14. In a process according to claim 12, the improvement which consists in filling moulds with said mouldable composition and introducing the moulds under a press maintained at a uniform temperature.

15. In a process according to claim 14, the improvement which consists in heating the press at a uniform temperature comprised between 100 and 180° C. and exerting on the moulds a pressure between 10 and 200 kg./cm.$^2$ for a time between 1 minute and 6 hours.

References Cited

UNITED STATES PATENTS

| | | | |
|---|---|---|---|
| 3,098,832 | 7/1963 | Pooley et al. | 260—2.5 |
| 3,282,864 | 11/1966 | Bost et al. | 260—2.5 |

FOREIGN PATENTS 908,224    10/1962    Great Britain.

GEORGE F. LESMES, *Primary Examiner.*

J. C. BLEUTGE, *Assistant Examiner.*